Jan. 26, 1965 F. B. HARLEY 3,166,811
RELEASABLE CONNECTORS
Filed March 26, 1962 2 Sheets-Sheet 1

INVENTOR
FRANK B. HARLEY
BY
ATTORNEYS

Jan. 26, 1965  F. B. HARLEY  3,166,811
RELEASABLE CONNECTORS

Filed March 26, 1962  2 Sheets-Sheet 2

INVENTOR
FRANK B. HARLEY

BY
ATTORNEYS

United States Patent Office 3,166,811
Patented Jan. 26, 1965

3,166,811
RELEASABLE CONNECTORS
Frank Bernard Harley, 46 Northcroft Road, Englefield
Green, Egham, Surrey, England
Filed Mar. 26, 1962, Ser. No. 182,367
Claims priority, application Great Britain, Apr. 6, 1961,
12,485
8 Claims. (Cl. 24—230)

This invention relates to releasable connectors for securing together two parts which may, for instance, have secured to them the ends of two belts or the opposite ends of a single belt. The connector is of particular use as a seat or similar harness in motor vehicles or in aircraft.

According to one aspect of the present invention a releasable connector comprises two parts having co-operating latching shoulders for engagement with one another to transmit a load between the parts in a generally linear direction but separable from one another in a direction generally at right angles to the linear direction, a locking lever pivotally mounted on one part, referred to as the first part, and having a fingerpiece by which the lever can be manually rotated between a locking position and a release position, the lever having an integral thrust portion which, in the locking position, bears on the second part to prevent separation of the shoulders, but which in the release position is clear of the second part to permit separation of the parts.

Conveniently the lever, when in its locking position, lies in a overcentre position so that it does not tend to freely return to the release position. Thus a surface portion of the second part, in the locking position, lies nearer to the lever pivot than it does when the thrust portion of the lever rides over the surface portion as the lever is moved from the locking position to the release position or vice versa. For example, the material of the two parts may be such that as the lever is moved to its locking position the said thrust surface of the lever bears on the second part and moves the surface portion of the second part against its natural resilience until the said thrust surface goes over-centre whereafter the natural resilience of the second part moves the said portion closer to the lever pivot.

In a particular arrangement the first and second parts comprise plates which overlap one another when the latching shoulders are connected, one of the latching shoulders being afforded by the margin of a hole and the other by a protuberance adapted snugly to engage in the hole. The protuberance may either protrude from only one side of its plate or from both sides. Where the protuberance only extends from one side it is arranged that the lever cannot be moved to the locking position until the latching shoulders are engaged with one another.

The protuberance may alternatively be formed by stamping out a sprag from the surface of the plate.

Latching means may be provided for holding the lever in the locking position. For example, one or more plungers may be carried by the side or sides of the lever which plungers engage in holes or the like in side rails of the first part. The plungers are conveniently spring-biassed so that they protrude into their holes.

A spring may be provided which tends to separate the two parts when the lever is moved to its release position. The spring is conveniently in the form of a U-shaped leaf spring extending around the hole and protuberance.

According to another aspect of the invention releasable connector comprises first and second plate-like parts, one part having an aperture and the other part a protuberance for engagement in the aperture, and when so engaged being capable of transmitting a load between the parts in a linear direction, the protuberance being engageable in and removable from the aperture in a direction generally at right angles to the said direction, a locking lever pivotally mounted on the first part, the lever having a fingerpiece by which the lever can be manually rotated between a release position and a locking position, the lever having an integral thrust portion, which portion in the locking position bears on a region of the second part situated adjacent the said aperture and protuberance, thereby to retain the protuberance in the aperture, the thrust portion in the release position being clear of the second part to permit separation of the two parts.

In a specific arrangement a releasable connector comprises a first plate having an aperture therein, a second plate having a protuberance thereon to engage in the aperture when second plate overlies the first plate to transmit a load between the plates in a linear direction generally in the plane of the plates, a pair of lugs extending from opposite side edges of the first plate at right angles to it, a locking lever pivotally mounted between the lugs, the lever having an integral fingerpiece by which the lever can be manually rotated between a release position and a locking position, the lever having an integral thrust portion which in the locking position bears on the second plate to retain the protuberance in the aperture, the thrust portion being moved clear of said second plate in the release position to permit separation of the plates in a direction generally at right angles to the said linear direction.

The invention may be carried into practice in a number of ways but four specific embodiments will now be described by way of example with reference to the accompanying drawings, in which.

Figure 1:
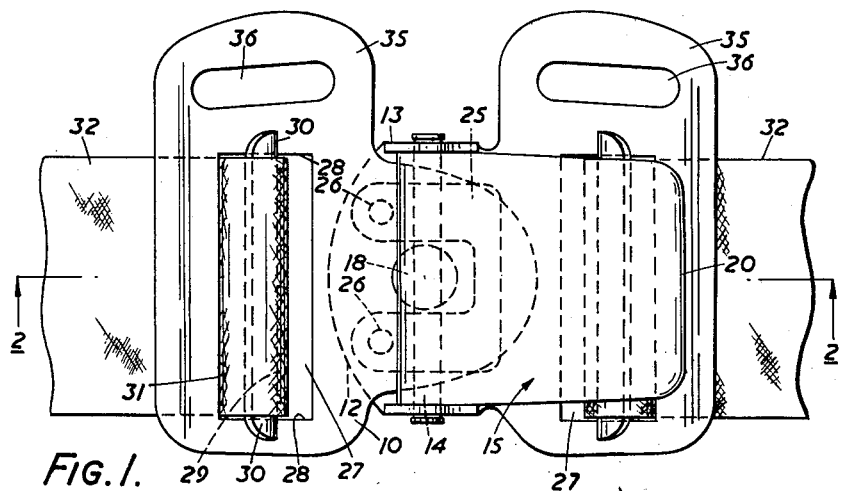
FIGURE 1 is a plan view of a releasable connector according to the present invention with two strap ends threaded through it.
Figure 2:
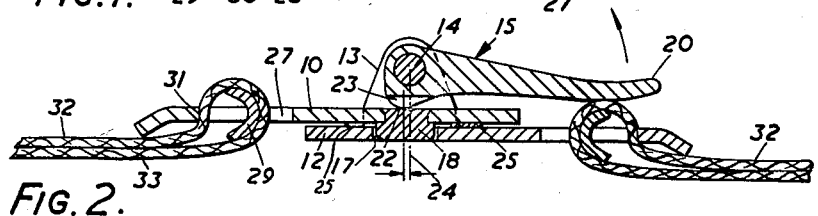
FIGURE 2 is a sectional side elevation on the line 2—2 of FIGURE 1.
Figure 5:
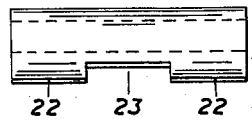
FIGURE 5 is an elevation showing the form of the lever of both the embodiments of FIGURES 1, 2 and 3, 4.

The embodiment shown in FIGURES 1 and 2 is intended for use with a seat and shoulder harness in a motor vehicle. The connector comprises two releasable parts one in the form of a flat plate 10 and the other in the form of a plate 12 having a pair of upstanding triangular lugs 13 between which extends a rod 14 forming a pivot for a locking lever generally indicated at 15. The plate 12 has in it a hole 17 to receive a pin 18 secured to the flat plate 10 as shown in FIGURE 2. The lever 15 is of somewhat triangular shape in section so that as viewed in FIGURE 2 it is thicker around the pivot pin 14 than at its right-hand free end 20. This free end 20 is upturned slightly to afford a fingerpiece by which the lever can be raised from its operative or locking position in FIGURE 2 to an inoperative or release position as will be referred to later. The lever 15 affords a locking edge 22 which in the locking position of FIGURE 2 acts as a thrust surface and bears on the plate 10 to hold it in the position shown with the pin 18 in the hole 17 so that a load can be transmitted between the plates in a linear direction generally in the plane of the plates. It will be seen from FIGURE 5 that the locking edge 22 is cut away in a central position 23 so that the edge 22 is formed in two portions to engage the plate 10 on each side of the pin 18. In the locking or operative position shown in FIGURE 2, the actual edge 22 which is acting on the plate 10 is shown to the left of a vertical line 24 through the centre of the pivot pin 14. Hence the lever in this position has gone overcentre since the locking edge 22 is at a radius slightly greater than the distance between the axis of the pivot pin 14 and the plate 10 along the vertical line 24. This overcentre action holds the lever in the locking position so that there is no tendency for it to fall open to its release position.

As shown in FIGURES 1 and 2 situated between the plates 10 and 12 is a leaf spring 25 of U-shape which is rivetted to the plate 12 at 26. The ability for the lever to go over-centre is due partly to the use of the leaf spring 25, which is bowed outwardly away from the plate 12, and partly to the resilience of the material forming the plate 10. In fact the over-centre feature can be obtained without the use of the spring 25.

However, the main purpose of the spring 25 is to ensure that once the locking lever 15 is raised to its release position the spring 25 will bias the plate 10 upwards so that the pin no longer engages in the hole 17 and instantaneous release of the two parts of the connector is made possible. The plate 10 and the plate 12 each have in them an opening 27 which is of rectangular shape. Loosely extending between the sides 28 of each of these openings 27 is an auxiliary anchorage 29 formed from a curved piece of sheet material and having earpieces 30 overlying the top and bottom surfaces of the plate 10 to locate the anchorage in the opening 27 but to allow the auxiliary anchorage 29 to slide to and fro in the opening 27. The strap end to be connected to the plate 10, for example, is threaded up around the curved surface of the auxiliary anchorage 29 and then back between the auxiliary and the outside edge 31 of the longitudinal edge of the opening 27 which will be referred to as the gripping edge 31. The free strap end 32 then extends between the plate 10 and the standing part of the strap 33. It will be seen that the other strap end is secured in a similar way to the plate 12. A tension in the standing part 33 of the strap causes the auxiliary anchorage to move towards the gripping edge 31 to grip the strap therebetween and hold it firmly to prevent it slipping through the opening 27. An increase in tension in the strap 33 only tends to increase the grip on the strap. On the other hand the strap can be drawn-up without difficulty by a light tension on the free end 32.

As shown in FIGURE 1 the plates 10 and 12 each have a lateral extension 35 having in it a slot 36 to which a sewn loop of a shoulder strap can be secured.

Thus, in use as a seat harness, for example in a car, two shoulder straps extend one to each of the slots 36 whilst the ends of the seat straps are looped around the auxiliary anchorages 29 of the plates 10 and 12. The pin 18 of the plate 10 is engaged in the hole 17 in the plate 12 with the locking lever 15 in its raised, release, position and thereafter the locking lever is lowered to its locking position shown in FIGURE 2 to retain the plates firmly held together. One or both seat straps can then be tightened by drawing on the free end 32 on one or both sides.

The dimensions of the lever 15 and the pin 18 are in this embodiment so arranged that the lever cannot be moved to the locking position of FIGURE 2 unless the pin is in line with the opening 17. This prevents any possibility of the user thinking that the locking lever is in the latched position when the pin has not been engaged in its hole.

In this embodiment the pin 18 only protrudes from one side of the plate 10 so that the plate 10 can only be secured in the position shown and not if it is inverted. This is, of course, because the plate 10 carries the lateral extension 35 to which a shoulder strap is secured.

Figure 3:
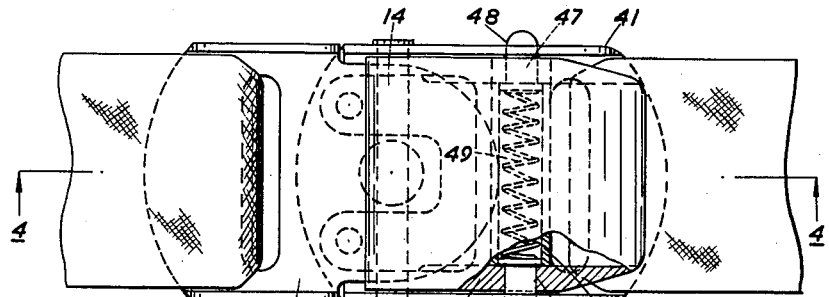
FIGURE 3 is a view similar to FIGURE 1 of a second embodiment having a spring-operated latch.
Figure 4:
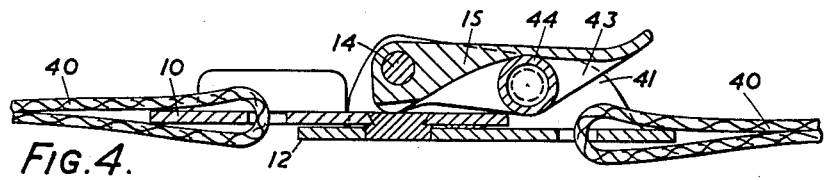
FIGURE 4 is a sectional side elevation on the line 4—4 of FIGURE 3.

The second embodiment of FIGURES 3 and 4 is basically the same as the first and similar parts bear the same reference numerals. The connector shown in this embodiment has secured to it a pair of sewn strap loops 40 and a tension can be placed in these strap portions by a tensioner or other device (not shown). In this instance the plate 12 has upstanding from its sides side rails 41 having extending between them, and adjacent one end, the pivot pin 14 for the locking lever 15. In this embodiment the locking lever is hollowed out underneath between two side portions 43. Extending between these side portions is a sleeve 44 aligned with openings 45 in the side portions 43 and openings 46 in the side rails 41. The ends of the sleeve 44 have within them headed plungers 47 having rounded ends 48 which protrude through the openings 46 and are biassed outwards to this position by a compression spring 49. In the locking position shown in FIGURES 3 and 4 therefore, the locking lever 15 is latched in its operative position, release being obtained by finger and thumb pressure on the protruding ends 48 of the plungers 47. When these are forced in flush with the side rails 41 the lever can then be raised to its inoperative position to permit release of the plate 10 from the plate 12.

Figure 6:
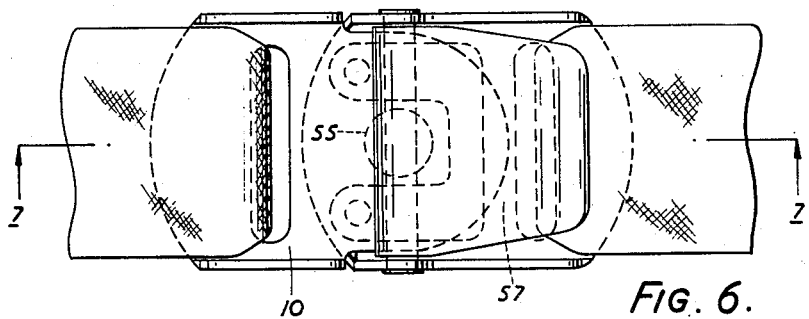
FIGURES 6 and 7 are similar views of a third embodiment.
Figure 7:
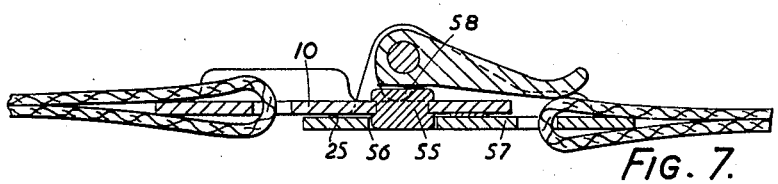

FIGURES 6 and 7 show a further embodiment in which the plate 10 has a pin 55 protruding from both sides of it so that the plate 10 can be inserted into the hole 56 of the other part 57 either way up. To make this insertion possible the central portion 58 of the lever between the gripping surfaces which engage the top of the plate 10 is deeper than the cut-out 23 in the first two embodiments.

Figure 8:
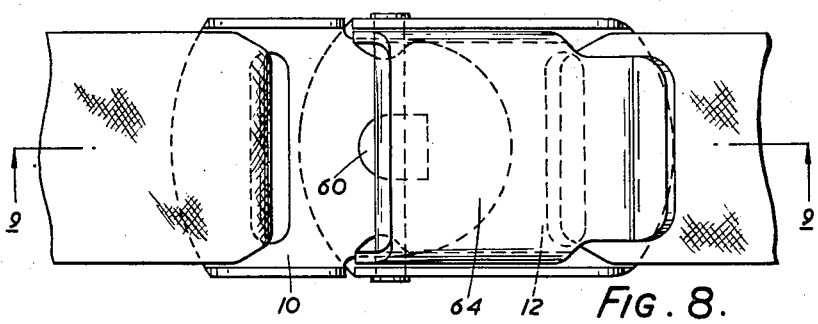
FIGURES 8 and 9 are similar views of a fourth embodiment.
Figure 9:
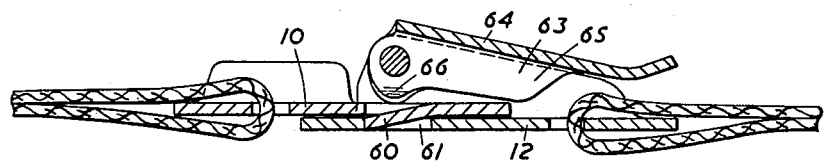

In the embodiment of FIGURES 8 and 9 the plate 10 does not carry a pin but instead has a punched-out D-shaped tag 60 which engages a correspondingly D-shaped hole 61 in the plate 12. In this embodiment the latching lever 63 is formed of sheet material and is of generally U-section comprising a top 64 and sides 65, the latter have protuberances 66 which are incurved slightly towards one another as shown in FIGURE 8 and which bear on the plate 10 to secure it in position in a manner closely analogous to the operation of the other embodiments.

In each of the embodiments described the lever can very easily be moved to and from the locking position regardless of the load on the strap. For example instant release can be obtained by applying a force of not more than 45 lbs. to the lever even though the load on the strap may exceed 200 lbs.

What I claim as my invention and desire to secure by Letters Patent is:

1. A releasable connector comprising first and second parts each having a latching shoulder, the latching shoulders being adapted, when brought into engagement with each other, to transmit a load between the parts in a linear direction, said latching shoulders being separable by movement of said first and second parts away from one another in a release direction generally at right angles to the said linear direction, one of said parts carrying a spring positioned to contact the under side of the other part when said latching shoulders are being brought into engagement with each other and remain between the parts during such engagement, a locking lever pivotally mounted on the first part, said lever having a finger piece by which it may be manually rotated between a locking position and a release position and a thrust portion integral with said locking lever, the said thrust portion having a bearing surface positioned to bear on the second part during rotation of the lever and move the latching shoulders into engagement with one another, while stressing the spring, and then swing on into an over-center position past the point at which said thrust portion first bears on said second part as said lever passes from its release to its locking position, said bearing surface being further from the pivotal axis of said lever than the adjacent surfaces of said thrust portion, and the said spring being positioned between the parts to cause separation of the parts in the release direction when said thrust portion is moved clear of the second part, and to bias the second part against the thrust portion to yieldingly retain said thrust portion in its over-center position whenever said thrust portion occupies that position.

2. A connector as claimed in claim 1 in which the first and second parts comprise plates which overlap one another when the latching shoulders are connected, one of said latching shoulders being afforded by the margin of a hole in one plate and the other latching shoulder being afforded by a protuberance extending from the other plate, the protuberance being adapted snugly to engage in the said hole.

3. A connector as claimed in claim 2 in which the protuberance protrudes from only one side of the plate.

4. A connector as claimed in claim 3 in which the said first and second parts and the lever are so dimensioned that the lever cannot be moved to the locking position until the latching shoulders are engaged with one another.

5. A connector as claimed in claim 2 in which the protuberance extends from both sides of the plate.

6. A connector as claimed in claim 1 including latching means for holding the lever in the locking position.

7. A connector as claimed in claim 6 in which the latching means comprises at least one plunger carried by the lever and arranged to co-operate with an aperture in the second part.

8. A releasable connector comprising a first plate having an aperture therein, a second plate having a protuberance thereon to engage in said aperture when said second plate overlies said first plate to transmit a load between the plates in a linear direction generally in the plane of the plate, the said aperture and protuberance being situated substantially midway between the sides of the plates, a pair of lugs extending from opposite side edges of the first plate at right angles to it, a locking lever pivotally mounted between said lugs, the lever having an integral fingerpiece by which the lever can be manually rotated between a release position and a locking position, the lever having an integral thrust portion which in the locking position bears on the second plate to retain said protuberance in said aperture, the said thrust portion being positioned to be clear of said second plate when said lever is in the release position to permit separation of the plates in a direction generally at right angles to said linear direction, and a leaf spring secured to the first plate and having portions on each side of the said aperture, the said portions lying in the path traversed by the second plate as the protuberance is inserted into the aperture, whereby such engagement stresses the said spring portions to cause separation of the plates when said thrust portion is moved clear of said second plate, said lever when in locking position lying over-center with a surface portion of the second plate lying nearer to the lever pivot than it does when the thrust portion of the lever is in the top center position as it passes between the locking and release positions.

References Cited in the file of this patent

UNITED STATES PATENTS

| | | |
|---|---|---|
| 230,827 | Sofield | Aug. 3, 1880 |
| 1,253,455 | Adams | Jan. 15, 1918 |
| 1,721,356 | Schulz | July 16, 1929 |
| 2,303,053 | Kneedler | Nov. 24, 1942 |
| 2,803,864 | Bishaf | Aug. 27, 1957 |
| 2,821,003 | Boyes | Jan. 28, 1958 |
| 2,904,866 | Carter | Sept. 22, 1959 |
| 2,953,830 | MacRae | Sept. 27, 1960 |
| 2,999,288 | Warner | Sept. 12, 1961 |
| 3,104,440 | Davis | Sept. 24, 1963 |

FOREIGN PATENTS

| | | |
|---|---|---|
| 108,759 | Austria | Feb. 10, 1928 |
| 1,093,125 | Germany | Nov. 17, 1960 |